(12) United States Patent
Sakai

(10) Patent No.: US 11,537,345 B2
(45) Date of Patent: Dec. 27, 2022

(54) PRINTING APPARATUS, PRINT PRODUCING METHOD, AND PROGRAM

(71) Applicant: SEIKO EPSON CORPORATION, Tokyo (JP)

(72) Inventor: Toshifumi Sakai, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/475,435

(22) Filed: Sep. 15, 2021

(65) Prior Publication Data

US 2022/0083299 A1    Mar. 17, 2022

(30) Foreign Application Priority Data

Sep. 17, 2020   (JP) .............................. JP2020-156018

(51) Int. Cl.
*G06F 3/12* (2006.01)
*H04N 1/00* (2006.01)

(52) U.S. Cl.
CPC .......... *G06F 3/1273* (2013.01); *G06F 3/1204* (2013.01); *H04N 1/00474* (2013.01); *H04N 1/00482* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 10,949,151 B2 | 3/2021 | Yoshida | |
| 11,079,992 B2 | 8/2021 | Omori | |
| 2010/0290068 A1 | 11/2010 | Okada et al. | |
| 2014/0036291 A1 | 2/2014 | Fujishita | |
| 2017/0090466 A1 | 3/2017 | Uomori | |
| 2018/0067978 A1 | 3/2018 | Matsuura | |
| 2018/0220015 A1 | 8/2018 | Akuzawa | |
| 2019/0245989 A1 | 8/2019 | Yoshida | |
| 2019/0384537 A1* | 12/2019 | Arai | G06F 3/1238 |
| 2020/0076970 A1 | 3/2020 | Chiba | |
| 2020/0159479 A1* | 5/2020 | Yoshida | G06F 3/1234 |
| 2020/0162628 A1* | 5/2020 | Horiike | G06F 3/1205 |
| 2021/0314454 A1 | 10/2021 | Chiba | |
| 2022/0083299 A1 | 3/2022 | Sakai | |

FOREIGN PATENT DOCUMENTS

| | | | |
|---|---|---|---|
| JP | 2020-088412 A | 6/2020 | |
| JP | 2020-088440 A | 6/2020 | |

\* cited by examiner

*Primary Examiner* — Frantz Bataille
(74) *Attorney, Agent, or Firm* — Global IP Counselors, LLP

(57) ABSTRACT

A printing apparatus including a plurality of operation modes including a copy mode is provided, the printing apparatus displays a main screen including a plurality of items respectively corresponding to the plurality of operation modes and operation histories in the past of the printing apparatus, displays, according to selection of the item corresponding to the copy mode out of the plurality of items displayed on the display section, a setting screen concerning the copy mode including the operation history concerning the copy mode extracted out of the operation histories, and, when the operation history displayed on the setting screen is selected by a user, performs reprinting according to setting included in the selected operation history.

6 Claims, 12 Drawing Sheets

PRINTING APPARATUS, PRINT PRODUCING METHOD, AND PROGRAM

The present application is based on, and claims priority from JP Application Serial Number 2020-156018, filed Sep. 17, 2020, the disclosure of which is hereby incorporated by reference herein in its entirety.

BACKGROUND

1. Technical Field

The present disclosure relates to a printing apparatus, a print producing method, and a program.

2. Related Art

There is a technique for displaying operation histories in the past of an apparatus side by side in time-series order.

JP-A-2020-88440 (Patent Literature 1) discloses a technique for displaying, in time order, side by side, a plurality of history records indicating histories of executed jobs and displaying error records, which indicate errors, side by side with the history records. JP-A-2020-88412 (Patent Literature 2) discloses a technique applicable to a configuration for displaying, on a timeline, an execution history of a function of using a saved file.

When the number of displays of histories in the past increases, time for visually recognizing the histories increases for a user. Therefore, it is difficult for the user to search for a target operation history.

SUMMARY

A printing apparatus includes a plurality of operation modes including a copy mode, the printing apparatus including: a display section configured to display a main screen including a plurality of items respectively corresponding to the plurality of operation modes and operation histories in past of the printing apparatus; and a display control section configured to switch, according to selection of the item corresponding to the copy mode out of the plurality of items displayed on the display section, the display of the display section to display a setting screen concerning the copy mode, the setting screen including the operation history concerning the copy mode extracted out of the operation histories.

A printing apparatus, that acquires a printing job using a plurality of ports including a first port, includes: a display section configured to display a main screen including a first item corresponding to the first port and operation histories in past of the printing apparatus; and a display control section configured to switch, according to selection of the first item displayed on the display section, the display of the display section to display the operation history corresponding to the printing job acquired using the first port extracted out of the operation histories.

A print producing method is executed by a printing apparatus including a plurality of operation modes including a copy mode, the printing apparatus including a display section configured to display a main screen including a plurality of items respectively corresponding to the plurality of operation modes and operation histories in past of the printing apparatus, and the print producing method includes: displaying, according to selection of the item corresponding to the copy mode out of the plurality of items displayed on the display section, a setting screen concerning the copy mode, the setting screen including the operation history concerning the copy mode extracted out of the operation histories; and, when the operation history displayed on the setting screen is selected by a user, performing reprinting according to setting included in the selected operation history to produce a print.

A print producing method is executed by a printing apparatus that acquires a printing job using a plurality of ports including a first port, the printing apparatus including a display section configured to display a main screen including a first item corresponding to the first port and operation histories in past of the printing apparatus, and the print producing method includes: displaying, according to selection of the first item displayed on the display section, the operation history corresponding to the printing job acquired using the first port extracted out of the operation histories; and, when the operation history is selected by a user, performing reprinting according to setting included in the selected operation history to produce a print.

A non-transitory computer-readable storage medium stores a program for causing a computer to function as: a display function for displaying, on a display section, a first screen including a plurality of items selectable by a user and operation histories in past; and a switching function for switching, according to selection of one of the items, the display of the display section to display a second screen including the operation history corresponding to the item among the operation histories, the second screen corresponding to the selected item.

DESCRIPTION OF EXEMPLARY EMBODIMENTS

Figure 1:
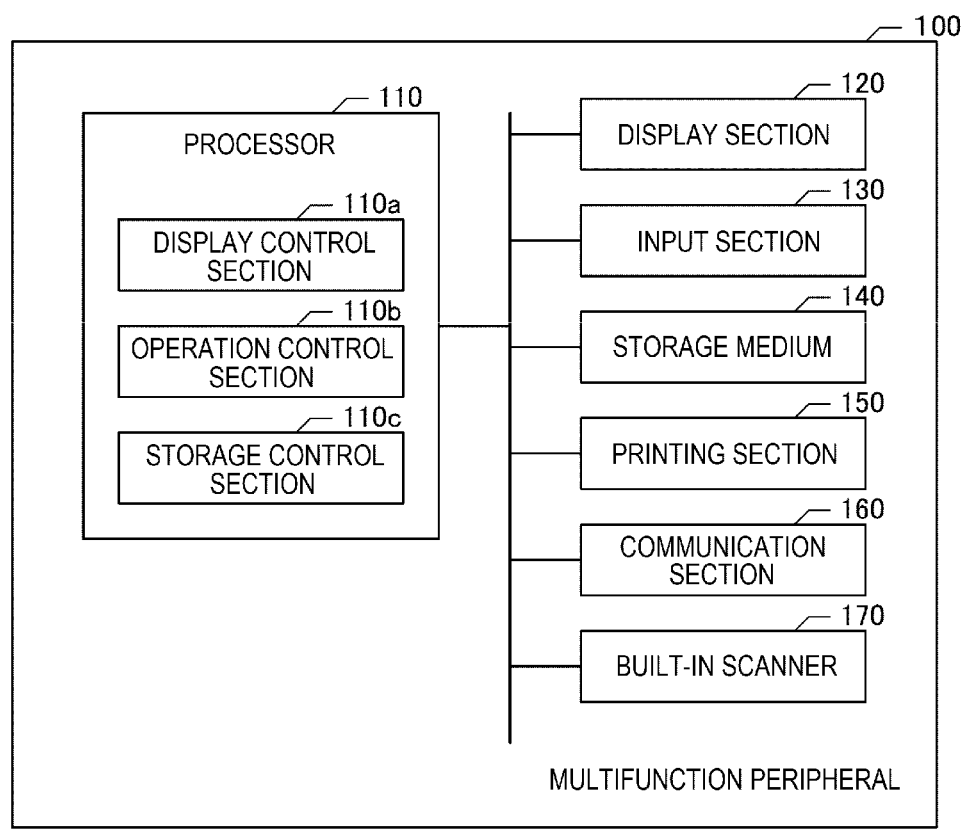
FIG. 1 is a diagram showing an example of the configuration of a printing apparatus.

Embodiments of the present disclosure are explained below according to order described below.
(1) First Embodiment
(1-1) Configuration of a Printing Apparatus
(1-2) Details of Processing of the Printing Apparatus (2) Second Embodiment
(2-1) Configuration of a Printing Apparatus
(2-2) Details of Processing of the Printing Apparatus
(3) Other Embodiments (1) First Embodiment (1-1) Configuration of a Printing Apparatus FIG. 1 is a diagram showing an example of the configuration of a multifunction peripheral 100 functioning as a printing apparatus in a first embodiment. The multifunction peripheral 100 in this embodiment includes a plurality of functions such as a copy function, a FAX function, and a scan function and includes a plurality of operation modes such as a copy mode for executing the copy function, a FAX mode for executing the FAX function, and a scan mode for executing the scan function. The copy mode is a mode for executing an operation for scanning a document and printing a scan result. The FAX mode is a mode for executing an operation for scanning a document and transmitting a scan result to a designated transmission destination. The scan mode is a mode for executing an operation for scanning a document and saving a scan result in a designated saving destination. The multifunction peripheral 100 includes a processor 110, a display section 120, an input section 130, a storage medium 140, a printing section 150, a communication section 160, and a built-in scanner 170.

The processor 110 includes a central processing unit (CPU), a random access memory (RAM), and the like, executes a program stored in the storage medium 140 or the like, and controls the multifunction peripheral 100. The processor 110 may be configured by a single chip or may be configured by a plurality of chips.

The display section 120 causes a display device such as a monitor or a touch panel to display information such as an operation screen of the multifunction peripheral 100. The display device may be a part of the multifunction peripheral 100 or may be a part of another apparatus. The display section 120 may cause the display device to display the information by projecting the information. The input section 130 is used to input information to the multifunction peripheral 100. The input section 130 is configured by, for example, hard buttons, an operation detecting section of the touch panel, or the like.

The storage medium 140 stores various programs, information concerning various screens, operation histories in the past of the multifunction peripheral 100, information concerning printing jobs executed in the past, and the like. The storage medium 140 is, for example, a read only memory (ROM), a hard disk drive (HDD), or a solid state drive (SSD).

The printing section 150 performs printing on a printing medium such as paper to produce a print according to an instruction from the processor 110. In this embodiment, the printing section 150 performs printing in an inkjet scheme but may perform printing in another scheme such as a laser printer scheme. The printing section 150 includes a conveying mechanism that conveys a printing medium and a printing head that ejects ink droplets to printing media such as paper, cloth, and a film.

The communication section 160 includes an interface for performing communication conforming to various communication protocols by wire or radio with an external device such as a client PC (personal computer) that uses the multifunction peripheral 100. Input devices such as a keyboard and a mouse and an output device such as a monitor are coupled to the processor 110 via the communication section 160. The processor 110 may perform input and output of various kinds of information via these devices.

In this embodiment, the processor 110 performs communication with an external device via the communication section 160 using one decided port and acquires a printing job from the external device. The printing job is a job of printing performed using the printing section 150. The job is control information for causing the multifunction peripheral 100 to perform an operation. Therefore, the printing job is printing control information for causing the printing section 150 to perform printing. The printing job is, for example, information including data of a printing target such as a PDF and printing setting information (setting of, for example, a paper size and a color) and information including data rasterized from the PDF and control information (for example, data indicating nozzles for each pixel). The port is information for identifying an application used for communication. In the following explanation, the decided port is a wireless communication port. However, the processor 110 may perform communication with an external device via the communication section 160 and acquire a printing job from the external device using a plurality of decided ports. The processor 110 performs communication with the built-in scanner 170, acquires scan data from the built-in scanner 170, and acquires a printing job about the acquired scan data using a decided port. In the following explanation, the port used for the communication with the built-in scanner 170 is referred to as scanner communication port. In this way, the processor 110 acquires the printing jobs using a plurality of ports.

The built-in scanner 170 includes a light source, a sensor, and the like, irradiates light on a document from the light source, reads light reflected by the document with the sensor, and acquires image data of the document.

In this embodiment, the processor 110 executes a program stored in the storage medium 140 to function as a display control section 110a, an operation control section 110b, and a storage control section 110c. The display control section 110a is a function of controlling display of information on the display section 120. The operation control section 110b is a function of performing control to execute an operation such as printing or FAX transmission according to an instruction for execution of the operation via a screen displayed by the display control section 110a. The storage control section 110c is a function of storing information concerning printing jobs executed by the operation control section 110b in the storage medium 140.

The display control section 110a includes a display function for displaying, on the display section 120, a main screen 200 used for operation of the multifunction peripheral 100 before selection of an operation mode and a switching function for switching the display of the display section 120 according to selection of an item displayed on the display section 120. When the multifunction peripheral 100 is started, the processor 110 functions as the display control section 110a and displays the main screen 200 on the display section 120. In this embodiment, the processor 110 acquires information concerning the main screen 200 (information such as items in the screen and arrangement positions of the items) from the storage medium 140, generates the main screen 200 based on the acquired information, and displays the main screen 200.

Figure 2:
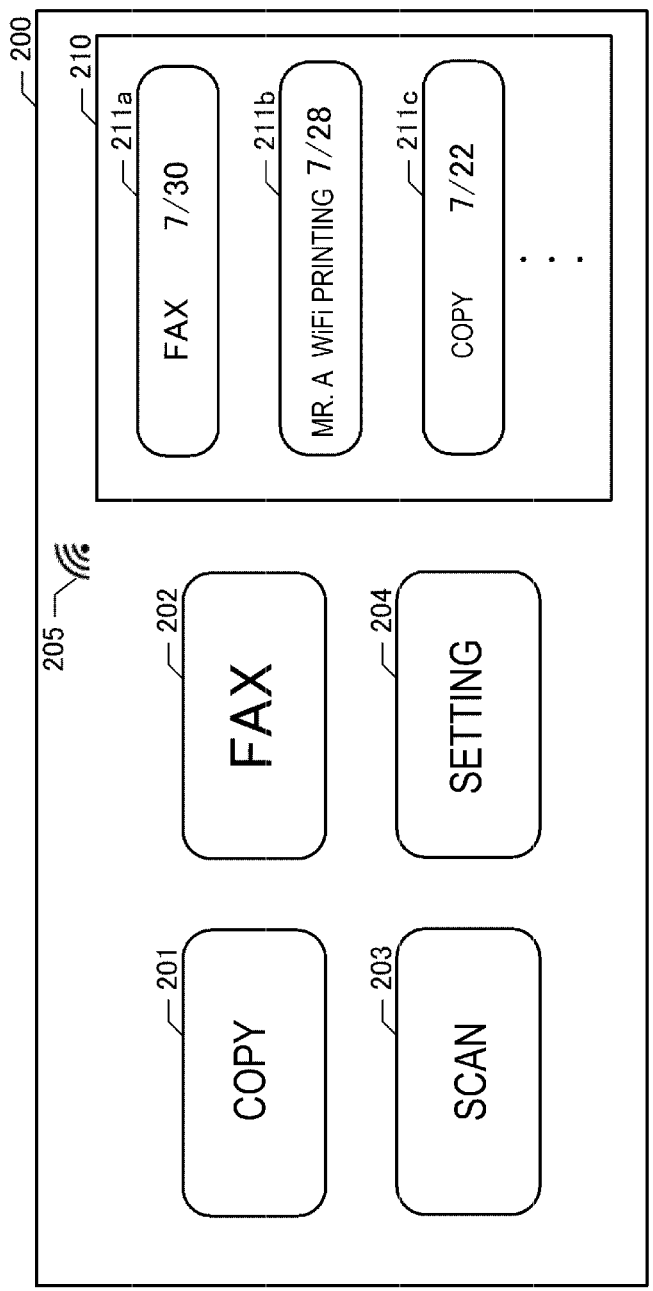
FIG. 2 is a diagram showing an example of a main screen.

An example of the main screen 200 displayed in this embodiment is shown in FIG. 2. The main screen 200 includes mode items 201 to 204, a radio wave mark 205, and a history display region 210.

The mode items 201 to 204 are respectively items (objects) used for instructions for shift to operation modes corresponding to the mode items 201 to 204. In this embodiment, the mode items 201 to 204 are respectively soft buttons. However, the mode items 201 to 204 may be other items such as images or text display blocks.

The mode item 201 is an item used for an instruction for shift to the copy mode for executing the copy function. The mode item 202 is an item used for an instruction for shift to the FAX mode for executing the FAX function. The mode item 203 is an item used for an instruction for shift to the scan mode for executing the scan function. The mode item 204 is an item used for an instruction for shift to a setting mode for executing a function of changing setting of the multifunction peripheral 100.

The radio wave mark 205 is an item indicating the intensity of a radio wave in wireless communication performed by the multifunction peripheral 100. In this embodiment, the multifunction peripheral 100 performs the wireless communication with an external device using the wireless communication port via the communication section 160. The radio wave mark 205 is an item corresponding to the wireless communication port.

The history display region 210 is a region where history items 211 indicating operation histories in the past of the multifunction peripheral 100 are displayed in time-series order about periods when operations were performed. In this embodiment, every time the processor 110 executes an operation such as a printing job or scan, the processor 110 stores an operation mode, a value of each of setting items, a date and time, and a user of the operation in the storage medium 140 as information concerning an operation history in association with one another. When displaying the history items 211, the processor 110 extracts an operation mode and, if present, a user from operation histories corresponding to the history items 211 and displays the operation mode and the user on the history items 211. When the history item 211 is selected, the processor 110 extracts values of setting items from operation histories corresponding to the selected history item 211. When displaying a setting screen for an operation mode corresponding to the selected history item 211, the processor 110 sets a state in which the extracted values are selected on the setting screen.

The processor 110 acquires information concerning operation histories of operations performed in the multifunction peripheral 100 in the past from the storage medium 140 and displays the history items 211 (in the example shown in FIG. 2, history items 211a, 211b, 211c, . . . ) in the history display region 210 based on the acquired information. The history items 211 are respectively items indicating operation histories in the past of the multifunction peripheral 100. In this embodiment, the history items 211 are soft buttons including texts indicating operations performed in the past and dates and times when the operations were performed. The history item 211a indicates an operation history of FAX transmission performed on July 30. The history item 211b indicates an operation history of printing instructed from Mr. A via Wifi communication on July 28. The history item 211c indicates an operation history of copying performed on July 22.

The processor 110 displays the history items 211 respectively in the longitudinal direction side by side such that the history items 211 are displayed in upper parts as the operations of the history items 211 were performed more recently. More specifically, the processor 110 extracts dates and times associated with operation histories, sorts the operation histories in descending order of the extracted dates and times to specify time-series order, and displays, in the specified order, side by side, the history items 211 indicating the operation histories. However, the processor 110 may display the history items 211 in another display form. For example, the processor 110 may display the history items 211 respectively in the history display region 210 such that the history items 211 are displayed in lower parts as the operations of the history items 211 were performed more recently. The processor 110 may display the history items 211 respectively in the lateral direction side by side in the history display region 210. In that case, the processor 110 may display the history items 211 closer to the right or closer to the left as the operations of the history items 211 were performed more recently.

In this embodiment, the processor 110 generates the history display region 210 as a region that can be scrolled according to swipe operation in a decided direction on the touch panel of the input section 130, operation of a hard button of the input section 130, or the like. Consequently, the processor 110 can include the history items 211 in the history display region 210 even if not all of the history items 211 can be displayed on the display section 120 at a time.

When any one of the history items 211 is selected based on operation on the input section 130 by the user, the processor 110 shifts to an operation mode corresponding to the selected history item 211. More specifically, the processor 110 displays a setting screen concerning the operation mode on the display section 120. The setting screen is a screen used for at least a part of an instruction for an operation in the operation mode corresponding to the setting screen and a change of various settings of the operation. The processor 110 adjusts values of setting items, which can be set via the setting screen, to the same values as values of setting items in the selected history item 211. The processor 110 controls display forms of items on the setting screen according to the adjusted values of the setting items. When the user desires to perform an operation under the same conditions as conditions of an operation in the past, the user only has to select the history item 211 or may not input various settings to be the same values as values of the setting items in the past. That is, the processor 110 enables the operation under the same conditions as the conditions of the operation performed in the past to be more easily executed.

When the number of history items 211 displayed in the history display region 210 increases, the user searches for a target history item 211 from a larger number of history items 211. Time for searching for the history item 211 increases. It is difficult to search for the history item 211.

Therefore, in this embodiment, the processor 110 functions as the display control section 110a and performs the following according to selection of any one of the mode items 201 to 204. That is, the processor 110 extracts operation histories concerning operation modes corresponding to the selected mode items 201 to 204 out of operation histories in the past of the multifunction peripheral 100 stored in the storage medium 140. The processor 110 switches the display of the display section 120 to display a setting screen about the operation modes corresponding to the selected mode items, the setting screen including the history display region 210 in which the history items 211 indicating the extracted operation histories are displayed.

In this embodiment, the processor 110 functions as the display control section 110a and performs the following according to selection of the radio wave mark 205. That is, the processor 110 extracts an operation history of a printing job acquired by wireless communication corresponding to the radio wave mark 205 out of the operation histories in the past of the multifunction peripheral 100 stored in the storage medium 140. That is, the processor 110 extracts, out of the operation histories stored in the storage medium 140, an operation history of a printing job acquired using the wireless communication port corresponding to the radio wave mark 205, the printing job having been executed in the past by the multifunction peripheral 100. The processor 110 switches the display of the display section 120 to display the history item 211 indicating the extracted operation history.

An example of more specific processing of the display control section 110a of the processor 110 is explained with reference to FIGS. 3 to 5.

Figure 3:
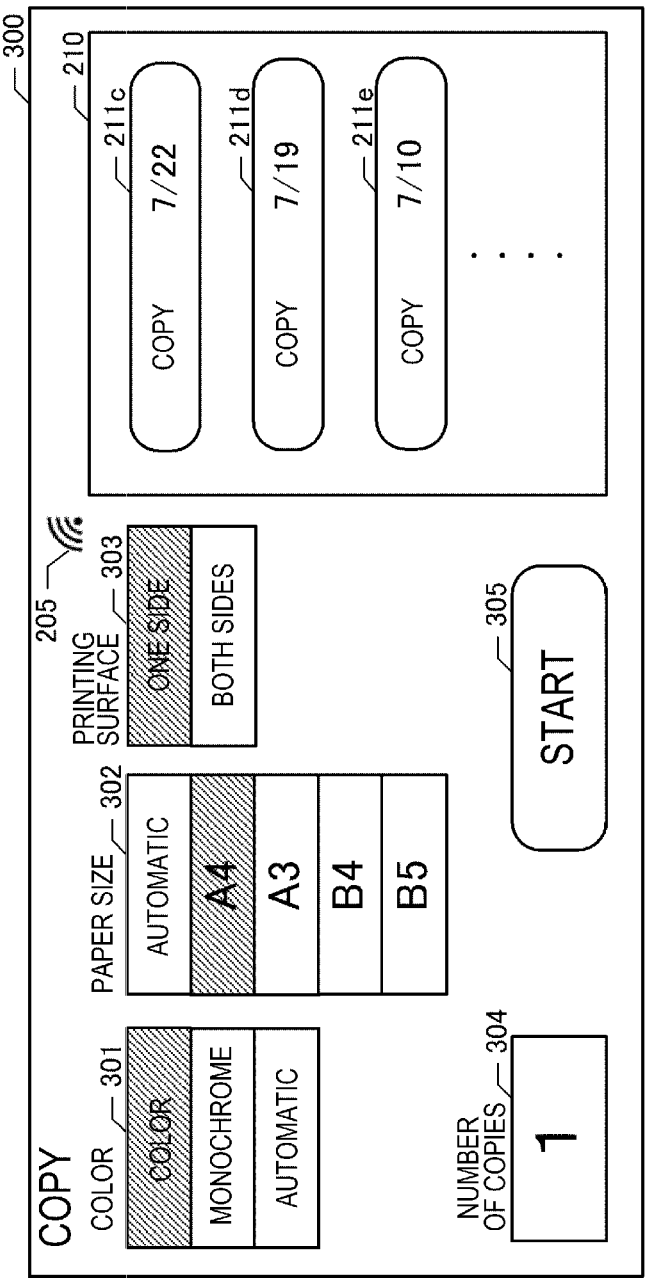
FIG. 3 is a diagram showing an example of a setting screen concerning copying.

When the mode item 201 is selected by the user, the processor 110 switches the display of the display section 120 to display a setting screen 300 concerning the copy mode shown in FIG. 3. More specifically, when the mode item 201 is selected, the processor 110 extracts information concerning an operation history of an operation (copying) in the copy mode out of the information concerning the operation histories of the multifunction peripheral 100 stored in the storage medium 140. The processor 110 acquires information concerning the setting screen 300 (information such as items in the screen and arrangement positions of the items) from the storage medium 140, generates the setting screen 300 based on the acquired information, and stores the generated information concerning the setting screen 300 in the RAM.

In an example shown in FIG. 3, the setting screen 300 includes a color selection region 301, a paper size selection region 302, a printing surface selection region 303, a number of copies designation region 304, an execution button 305, the radio wave mark 205, and the history display region 210.

The color selection region 301 is a region used for selection of color setting in printing. In the example shown in FIG. 3, the color setting can be selected out of "color" (printing in color), "monochrome" (printing in monochrome), and "automatic" (printing by determining and setting color or monochrome). In the example shown in FIG. 3, "color" is selected.

The paper size selection region 302 is a region used for selection of a size of paper to be printed. In the example shown in FIG. 3, the paper size can be selected out of "automatic" (setting for determining to which size the paper size is set), "A4", "A3", "B4", and "B5". In the example shown in FIG. 3, "A4" is selected.

The printing surface selection region 303 is a region used for selection of a printing surface. In the example shown in FIG. 3, the printing surface can be selected out of "one side" and "both sides". In the example shown in FIG. 3, "one side" is selected.

The number of copies designation region 304 is a region used for designation of the number of copies. In the example shown in FIG. 3, 1 is designated as the number of copies. The execution button 305 is a button used for designation of execution of printing. When the processor 110 functions as the operation control section 110b and detects selection of the execution button 305, the processor 110 executes printing under conditions corresponding to values set in the color selection region 301, the paper size selection region 302, the printing surface selection screen 303, and the number of copies designation region 304.

When generating the setting screen 300, the processor 110 includes, in the history display region 210, the history items 211 indicating extracted operation histories to be displayed in time-series order. The processor 110 acquires operation histories associated with the same operation mode as an operation mode corresponding to a selected mode item, that is, in this example, operation histories corresponding to the copy mode. Further, the processor 110 extracts dates and times associated with the acquired operation histories and sorts the operation histories in descending order about the extracted dates and times to specify time-series order. In the example shown in FIG. 3, the history display region 210 includes history items 211 (history items 211c, 211d, 211e, . . . ) concerning copying performed in the past. The processor 110 switches the display of the display section 120 to display the generated setting screen 300.

In this way, when the copy mode is selected, the processor 110 switches the display of the display section 120 to display the history items 211 about the copy mode. Consequently, in the copy mode, by not displaying unnecessary history items 211 concerning the operation modes different from the copy mode, the processor 110 can reduce the number of history items 211 to be displayed and make it easier for the user to search for a target history item 211.

Figure 4:
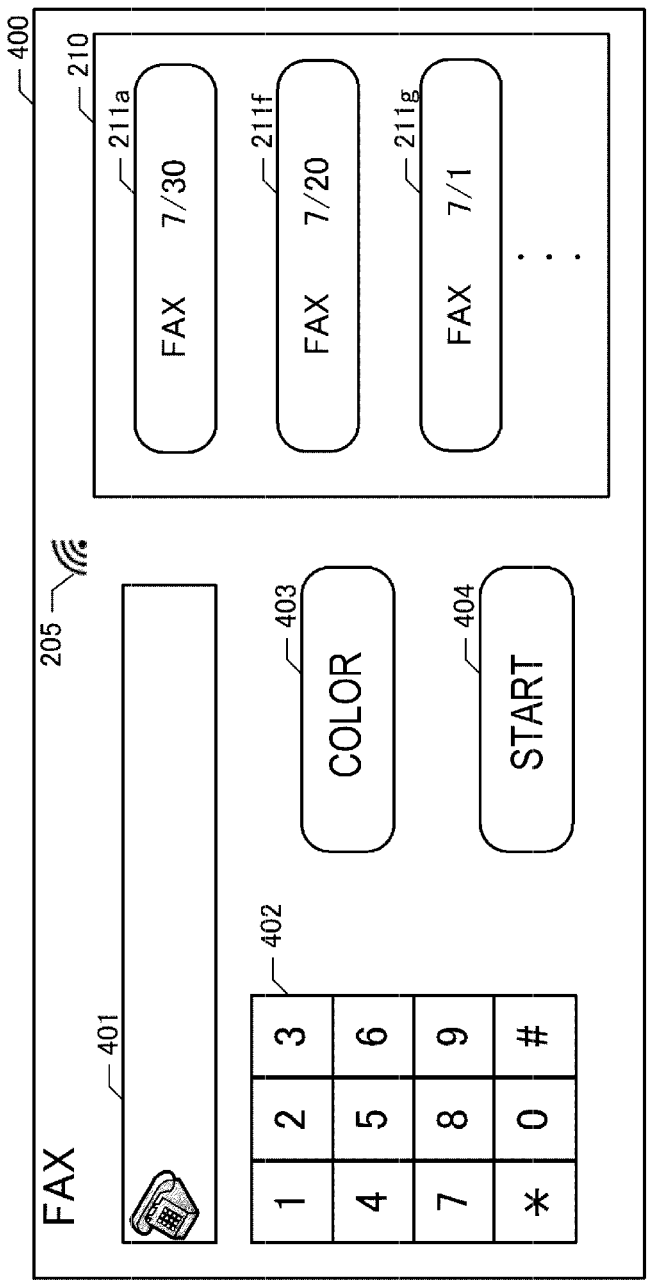
FIG. 4 is a diagram showing an example of a setting screen concerning FAX.

When the mode item 202 is selected, the processor 110 switches the display of the display section 120 to display a setting screen 400 concerning the FAX mode shown in FIG. 4. More specifically, when the mode item 202 is selected, the processor 110 extracts information concerning operation histories of operation (FAX transmission) in the FAX mode out of the information concerning the operation histories of the multifunction peripheral 100 stored in the storage medium 140. The processor 110 acquires information concerning the setting screen 400 (information such as items in the screen and arrangement positions of the items) from the storage medium 140 and generates the setting screen 400 based on the acquired information.

In an example shown in FIG. 4, the setting screen 400 includes a transmission destination number display region 401, a transmission destination number designation region 402, a color setting button 403, an execution button 404, the radio wave mark 205 and the history display region 210.

The transmission destination number display region 401 is a region where a number of a FAX transmission destination is displayed. A number designated using the transmission destination number designation region 402 is input to the transmission designation number display region 401. The transmission destination number designation region 402 is used to designate the number of the FAX transmission designation. Numbers 0 to 9 and signs "#" and "a sign obtained by rotating*90°" can be input to the transmission destination number designation region 402.

The color setting button 403 is a button used for an instruction for display of a screen used for color setting about FAX data. The execution button 404 is a button used for an instruction for execution of FAX transmission. When the processor 110 functions as the operation control section 110b and detects selection of the execution button 404, the processor 110 executes FAX transmission to the number displayed in the transmission destination number display region 401.

When generating the setting screen 400, the processor 110 includes, in the history display region 210, the history items 211 indicating extracted operation histories to be displayed in time-series order. In the example shown in FIG. 4, the history items 211 (history items 211a, 211f, 211g, . . . ) concerning FAX transmission performed in the past are displayed in the history display region 210. The processor 110 switches the display of the display section 120 to display the setting screen 400.

In this way, when the FAX mode is selected, the processor 110 switches the display of the display section 120 to display the history items 211 about the FAX mode. Consequently, in the FAX mode, the processor 110 does not display unnecessary history items 211 concerning the operation modes different from the FAX mode. Accordingly, the processor 110 can reduce the number of history items 211 to be displayed and make it easier for the user to search for a target history item 211.

Figure 5:
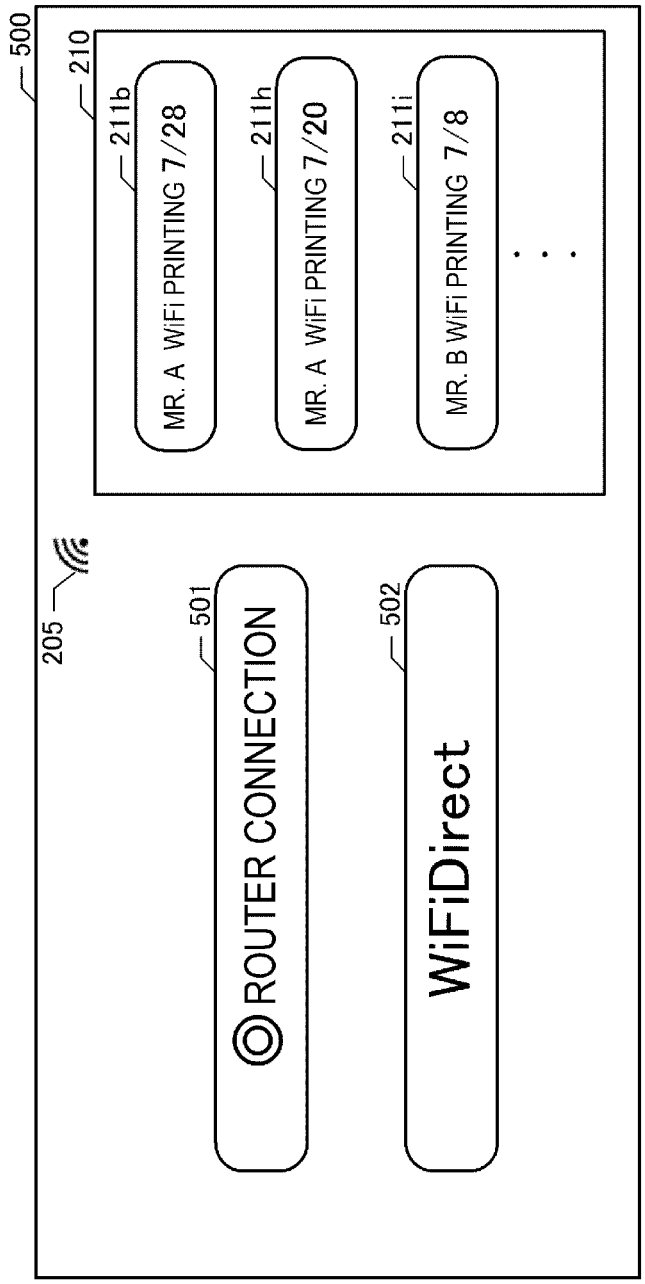
FIG. 5 is a diagram showing an example of a setting screen concerning a port.

When the radio wave mark 205 is selected, the processor 110 switches the display of the display section 120 to display a setting screen 500 concerning communication performed using a radio communication port shown in FIG. 5. More specifically, when the radio wave mark 205 is selected, the processor 110 extracts information concerning operation histories about printing jobs acquired using the wireless communication port out of the information concerning the operation histories of the multifunction peripheral 100 stored in the storage medium 140. The processor 110 acquires information concerning the setting screen 500 (information such as items in the screen and arrangement positions of the items) from the storage medium 140 and generates the setting screen 500 based on the acquired information.

In an example shown in FIG. 5, the setting screen 500 includes a router connection setting button 501, a WifiDirect setting button 502, the radio wave mark 205, and the history display region 210.

The router connection setting button 501 is a button used for an instruction for display of a screen used for a setting change for communication via a router performed using the wireless communication port. When communication via the router is effective, the processing 110 displays a double circle mark on the router connection setting button 501.

The WifiDirect setting button 502 is a button used for an instruction for display of a screen used for a setting change for communication in WifiDirect (registered trademark) performed using the wireless communication port. WifiDirect is a standard for directly connecting, without using a router, devices having a Wifi function by radio. By using WifiDirect, the multifunction peripheral 100 functions as an access point. The multifunction peripheral 100 can be directly connected to a PC and a smartphone without intervention of a router using a radio wave in a Wifi frequency band. When the communication via the router is effective, the processor 110 displays a double circle mark on the WifiDirect setting button 502.

When generating the setting screen 500, the processor 110 includes, in the history display region 210, the history items 211 corresponding to extracted operation histories to be displayed in time series. In the example shown in FIG. 5, in the history display region 210, the history items 211 (history items 211$b$, 211$h$, 211$i$, . . . ) concerning printing jobs acquired using the wireless communication port performed in the past are displayed. The processor 110 switches the display of the display section 120 to display the setting screen 500.

In this way, when the radio wave mark 205 is selected, the processor 110 switches the display of the display section 120 to display the history items 211 about the printing jobs acquired using the wireless communication port. Consequently, in a state in which the setting screen for the communication performed using the wireless communication port is displayed, the processor 110 does not display unnecessary history items 211 concerning an operation different from the printing jobs acquired using the wireless communication port. Consequently, the processor 110 can reduce the number of history items 211 to be displayed and make it easier for the user to search for a target history item 211.

In this embodiment, when the history item 211 concerning the copy mode is selected, the processor 110 functions as the operation control section 110$b$ and performs the following. That is, the processor 110 performs control to enable reprinting of a printing job corresponding to the selected history item 211, the printing job being a printing job performed in the past stored in the storage medium 140 by the function of the storage control section 110$c$. More specifically, the processor 110 acquires information concerning the printing job corresponding to the history item 211 selected from the storage medium 140. The processor 110 sets an image indicated by the acquired printing job as a printing target image and adjusts printing setting (setting of, for example, a color, a paper size, and a printing surface) to the same values as values of the acquired printing job. In this way, the processor 110 enables reprinting of the printing job. Note that, unless specifically noted otherwise, a reoperation in this embodiment includes not only a reoperation in a narrow sense for performing, based on image data stored as a part of an operation history, an operation again in setting stored as a part of the operation history but also a reoperation in a broad sense for performing, using setting stored as a part of the operation history, an operation based on new image data. Accordingly, the reprinting includes not only reprinting in a narrow sense for performing, based on image data stored as a part of an operation history, printing again using setting stored as a part of the operation history but also reprinting in a broad sense for performing, using setting stored as a part of the operation history, printing based on new image data generated by performing scanning anew.

The processor 110 functions as the display control section 110$a$ and displays the setting screen 300. In that case, the processor 110 sets respective displays in the color selection region 301, the paper size selection region 302, the printing surface selection region 303, and the number of copies designation region 304 to be displays corresponding to printing setting adjusted by the function of the operation control section 110$b$. When detecting selection of the execution button 305, the processor 110 executes printing to produce a print.

In this way, the processor 110 functions as the operation control section 110$b$ and, when the history item 211 concerning the copy mode is selected, enables reprinting of a printing job corresponding to the selected history item 211. Consequently, when reprinting of a printing job performed in the past is desired, the multifunction peripheral 100 can more easily enable the reprinting. By changing setting, it is also possible to more easily perform the reprinting in which a part of the setting is changed.

With the configuration explained above, the multifunction peripheral 100 displays the main screen 200 including a plurality of items selectable by the user and operation histories (history items) in the past. According to selection of one item, the multifunction peripheral 100 switches the display of the display section 120 to display a setting screen corresponding to the selected item, the setting screen including the history item 211 corresponding to the selected item among the history items 211. In this way, the multifunction peripheral 100 displays, in time-series order, the history items 211 corresponding to items selected by the user to not display unnecessary history items 211. Consequently, the processor 110 can reduce the number of history items 211 to be displayed and make it easier for the user to search for a target history item 211.

(1-2) Details of Processing of the Printing Apparatus

Details of processing of the multifunction peripheral 100 are explained with reference to flowcharts of FIGS. 6 and 7.

Figure 6:
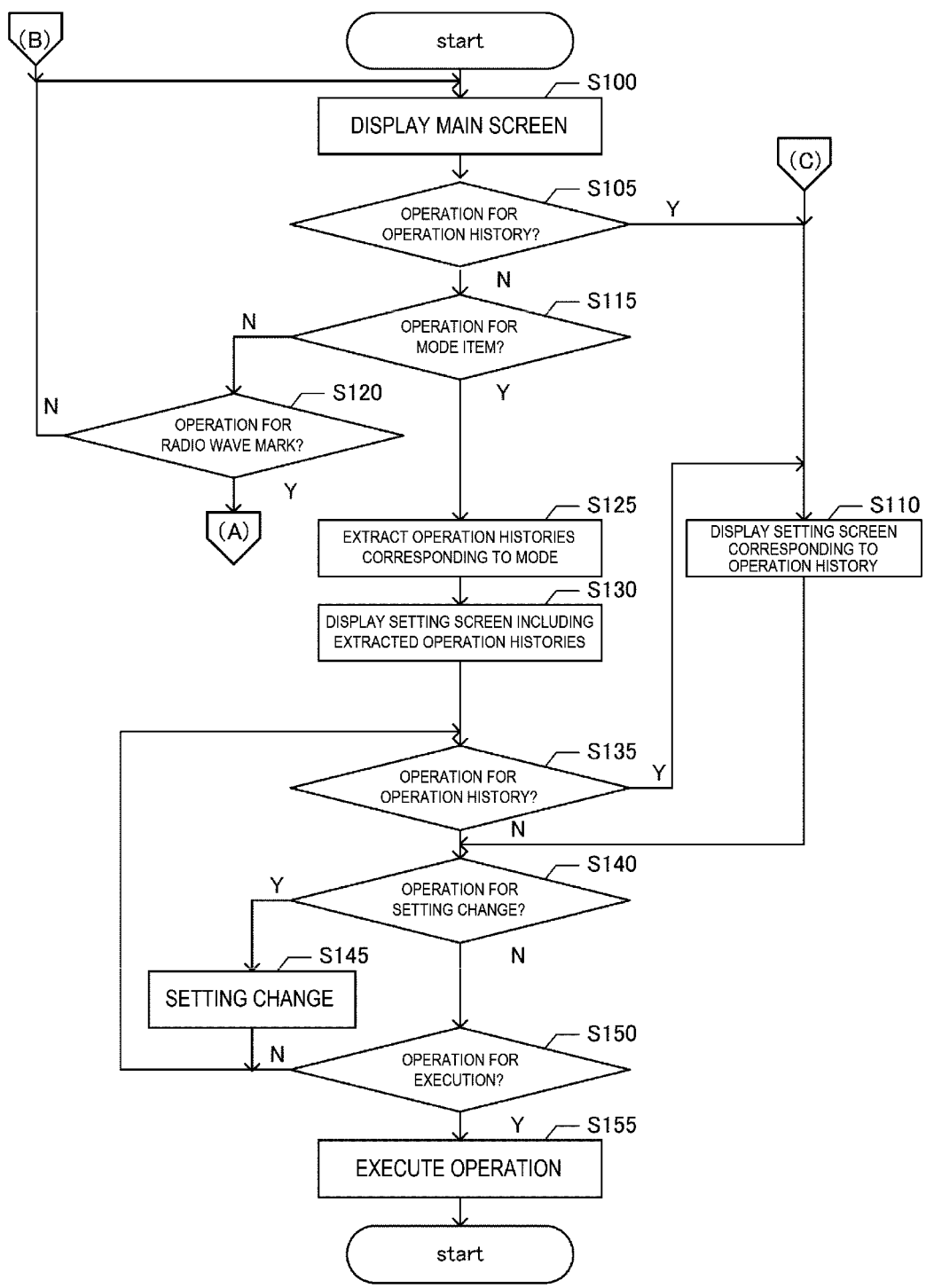
FIG. 6 is a flowchart showing an example of processing of the printing apparatus.
Figure 7:
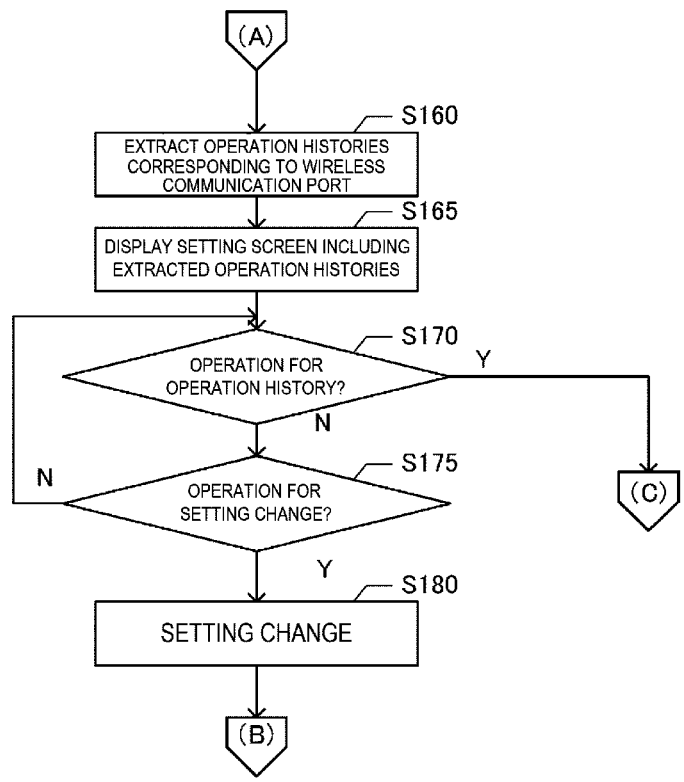
FIG. 7 is a flowchart showing the example of the processing of the printing apparatus.

In this embodiment, when the multifunction peripheral 100 is started, the processor 110 starts processing shown in FIGS. 6 and 7.

In S100, the processor 110 functions as the display control section 110a and displays the main screen 200 on the display section 120.

In S105, the processor 110 functions as the display control section 110a and determines whether operation for selecting the history item 211 included in the history display region 210 of the main screen 200 is performed via the input section 130. When determining that the operation for selecting the history item 211 is performed, the processor 110 advances the processing to S110. When determining that the operation for selecting the history item 211 is not performed, the processor 110 advances the processing to S115.

In S110, the processor 110 functions as the display control section 110a and displays, on the display section 120, a setting screen for an operation mode corresponding to the history item 211, the operation for selecting which is determined as being performed in S105. The processor 110 adjusts values of setting items, which can be set via the setting screen, to be the same as values of the setting items in the operation history indicated by the selected history item 211. The processor 110 adjusts a display form of items corresponding to the setting items in the setting screen to a display form corresponding to the adjusted values. For example, when the history item 211, the operation for selecting which is performed, indicates an operation history of FAX transmission to a certain FAX number, the processor 110 displays the setting screen 400 and displays the FAX number in the transmission destination number display region 401.

In S115, the processor 110 functions as the display control section 110a and determines whether operation for selecting anyone of the mode items 201 to 204 of the main screen 200 is performed via the input section 130. When determining that the operation for selecting any one of the mode items 201 to 204 is performed, the processor 110 advances the processing to S125. When determining that the operation for selecting any one of the mode items 201 to 204 is not performed, the processor 110 advances the processing to S120. In the following explanation, a mode item, the operation for selecting which is determined as being performed in S115, is referred to as selected mode item.

In S120, the processor 110 functions as the display control section 110a and determines whether operation for selecting the radio wave mark 205 of the main screen 200 is performed via the input section 130. When determining that the operation for selecting the radio wave mark 205 is performed, the processor 110 advances the processing to S160. When determining that the operation for selecting the radio wave mark 205 is not performed, the processor 110 advances the processing to S105.

In S125, the processor 110 functions as the display control section 110a and extracts operation histories concerning an operation mode corresponding to the selected mode item out of information concerning operation histories in the past of the multifunction peripheral 100 stored in the storage medium 140.

In S130, the processor 110 functions as the display control section 110a and generates a setting screen for the operation mode corresponding to the selected mode item. The processor 110 arranges, in the history display region 210 in the generated setting screen, in time-series order, the history items 211 indicating the operation histories extracted in S125. The processor 110 displays, on the display section 120, the setting screen including the history items 211.

In S135, the processor 110 functions as the display control section 110a and determines whether operation for selecting the history item 211 included in the history display region 210 of the setting screen displayed in S130 is performed via the input section 130. When determining that the operation for selecting the history item 211 is performed, the processor 110 advances the processing to S110. When determining that the operation for selecting the history item 211 is not performed, the processor 110 advances the processing to S140.

In S140, the processor 110 functions as the display control section 110a and determines whether operation for a setting change about operations is performed via the setting screen displayed in S130. The operation for the setting change about operations includes, for example, operation for changing a value about any one of the color selection region 301, the paper size selection region 302, the printing surface selection region 303, and the number of copies designation region 304 in the copy mode. The operation for the setting change about operations includes, for example, operation for a setting change via a screen displayed according to selection of an item (for example, the color setting button 403) in the setting screen.

When determining that the operation for the setting change about operations is performed, the processor 110 advances the processing to S145. When determining that the operation for the setting change about operations is not performed, the processor 110 advances the processing to S150.

In S145, the processor 110 functions as the operation control section 110b and performs a setting change for operations corresponding to the operation determined as being performed in S140. More specifically, the processor 110 receives a value after a change of a setting item by the operation determined as being performed in S140 and stores the received value in the RAM to perform the setting change.

In S150, the processor 110 determines whether operation for selecting an execution button (for example, the execution button 305 or the execution button 404) included in the setting screen displayed in S130 and used for an instruction for execution of operations is performed via the input section 130. When determining that the operation for selecting the execution button is performed, the processor 110 advances the processing to S155. When determining that the operation for selecting the execution button is not performed, the processor 110 advances the processing to S135.

In S155, the processor 110 executes an operation in the operation mode corresponding to the selected mode item and ends the processing shown in FIGS. 6 and 7. For example, when the operation mode is the copy mode, the processor 110 functions as the printing section 150 and performs printing to produce a print.

In S160, the processor 110 functions as the display control section 110a and extracts, from the storage medium 140, operation histories about printing jobs acquired using the wireless communication port corresponding to the radio wave mark 205, the printing jobs having being executed in the past.

In S165, the processor 110 functions as the display control section 110a and generates, on the RAM, the setting screen 500 corresponding to the wireless communication port. The processor 110 includes, in the history display region 210 in the generated setting screen 500, side by side, in time-series order, the history items 211 indicating the operation histories extracted in S160. The processor 110 refers to the RAM and displays, on the display section 120, the setting screen 500 including the history items 211.

In S170, the processor 110 determines whether operation for selecting the history item 211 included in the history display region 210 of the setting screen 500 displayed in S165 is performed via the input section 130. When determining that the operation for selecting the history item 211 is performed, the processor 110 advances the processing to S110. When determining that the operation for selecting the history item 211 is not performed, the processor 110 advances the processing to S175.

In S175, the processor 110 functions as the display control section 110a and determines whether operation for a setting change about communication performed using the wireless communication port is performed via the setting screen 500 displayed in S165. The operation for the setting change about communication includes, for example, operation for a setting change via a screen displayed according to selection of an item (for example, the router connection setting button 501 or the WifiDirect setting button 502) in the setting screen 500.

When determining that the operation for the setting change about communication is performed, the processor 110 advances the processing to S180. When determining that the operation for the setting change about communication is not performed, the processor 110 advances the processing to S170.

In S180, the processor 110 functions as the operation control section 110b and performs a setting change of communication corresponding to the operation determined as being performed in S175. The processor 110 advances the processing to S100.

(2) Second Embodiment (2-1) Configuration of a Printing Apparatus

Figure 8:
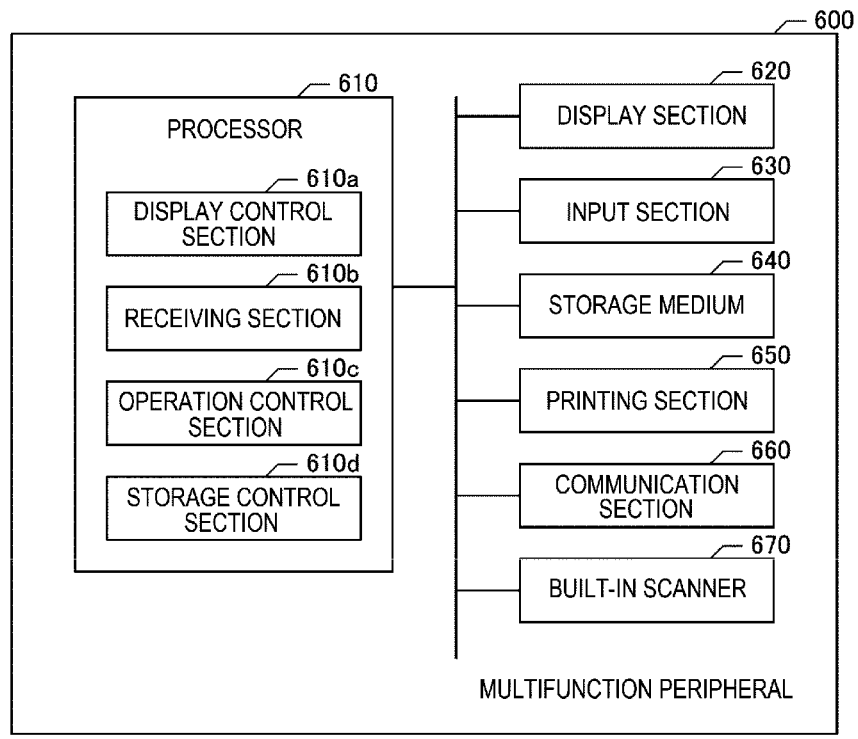
FIG. 8 is a diagram showing an example of the configuration of a printing apparatus.

FIG. 8 is a diagram showing an example of the configuration of a multifunction peripheral 600 in a second embodiment. Like the multifunction peripheral 100 in the first embodiment, the multifunction peripheral 600 in this embodiment includes a plurality of functions such as a copy function and a FAX function, includes a plurality of operation modes such as a copy mode and a FAX mode, and functions as a printing apparatus. The multifunction peripheral 600 includes a processor 610, a display section 620, an input section 630, a storage medium 640, a printing section 650, a communication section 660, and a built-in scanner 670.

The elements 610 to 670 of the multifunction peripheral 600 are respectively the same as the elements 110 to 170 of the multifunction peripheral 100 in the first embodiment.

In this embodiment, the processor 610 executes a program stored in the storage medium 640 to function as a display control section 610a, a receiving section 610b, an operation control section 610c, and a storage control section 610d. The display control section 610a is a function of controlling display of information on the display section 620. The receiving section 610b receives an instruction for a reoperation based on a history item. Like the operation control section 110b in the first embodiment, the operation control section 610c is a function of performing control to execute operations such as printing and FAX transmission according to an instruction for execution of operations via a screen displayed by the display control section 610a. Like the storage control section 110c in the first embodiment, the storage control section 610d is a function of storing, in the storage medium 640, information concerning a printing job executed by the operation control section 610c.

The display control section 610a in this embodiment includes, in addition to the same function as the function of the display control section 110a in the first embodiment, a function of displaying, in a decided display form, a history item about an operation executed according to selection of a history item.

Figure 9:
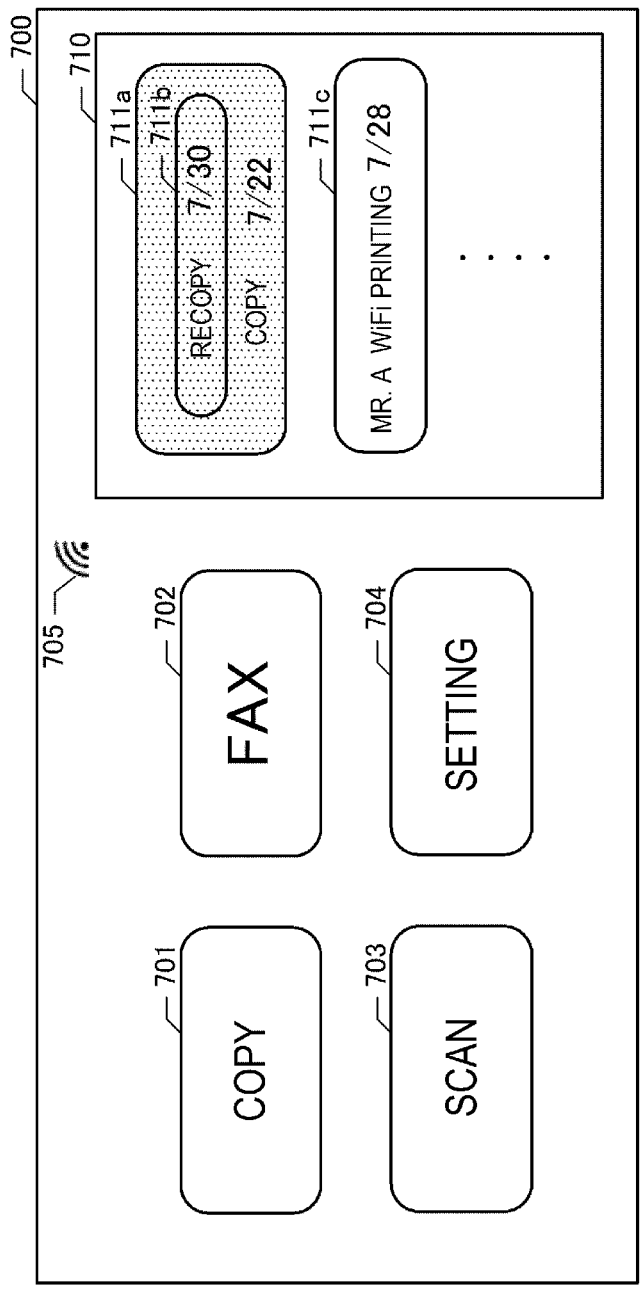
FIG. 9 is a diagram showing an example of a main screen.

When the multifunction peripheral 600 is started, the processor 610 functions as the display control section 610a and displays a main screen 700 shown in FIG. 9 on the display section 620. In this embodiment, the processor 610 acquires information about the main screen 700 (information such as items in the screen and arrangement positions of the items) from the storage medium 640, generates the main screen 700 based on the acquired information, and displays the main screen 700.

The main screen 700 includes mode items 701 to 704, a radio wave mark 705, and a history display region 710.

The mode items 701 to 704 are respectively the same as the mode items 201 to 204 in the first embodiment. The radio wave mark 705 is the same as the radio wave mark 205 in the first embodiment and is an item indicating the intensity of a radio wave in wireless communication performed by the multifunction peripheral 600. In this embodiment, the multifunction peripheral 600 performs wireless communication with an external device using a wireless communication port via the communication section 660. The radio wave mark 205 is an item corresponding to the wireless communication port. Like the history display region 210 in the first embodiment, the history display region 710 is a region where history items 711 indicating operation histories in the past of the multifunction peripheral 600 are timeline-displayed. The history items 711 are respectively the same as the history items 211 in the first embodiment.

In an example shown in FIG. 9, the history display region 710 includes a plurality of history items 711 (a history item 711a, a history item 711b, a history item 711c, . . . ). The history item 711a indicates an operation history about copying performed on July 22. The history item 711b indicates an operation history about a reoperation based on the history item 711a, the reoperation being an operation performed on July 30. The history item 711c indicates an operation history of printing instructed from Mr. A via Wifi communication on July 28.

A reoperation (for example, reprinting or re-FAX transmission) based on the history item 711 is the same operation as an operation performed according to selection of the history item 711 and corresponding to the selected history item 711. In this way, the same operation as an operation performed in the past is sometimes performed again. In the following explanation, when the same operation is performed a plurality of times, an original operation performed first is referred to as original operation.

Processing in which the processor 610 executes a reoperation based on the history item 711 is explained. In this embodiment, when the history item 711 about an operation history of a decided type (for example, copying or FAX) is selected via the input section 630, the processor 610 performs control to enable re-execution of an operation of the operation history indicated by the selected history item 711.

More specifically, the processor 610 shifts to an operation mode corresponding to the selected history item 711 and displays a setting screen concerning the operation mode on the display section 620. The processor 610 adjusts values of setting items, which can be set via the setting screen, to the same values as values of the operation corresponding to the operation history indicated by the selected history item 711. The processor 610 sets operation target data (for example, a printed image in the copy mode or a transmitted image in the FAX mode) to the same data of the operation history indicated by the selected history item 711. In this way, the processor 610 enables a reoperation of the operation of the operation history indicated by the selected history item 711.

The processor 610 functions as the receiving section 610*b* and receives an execution instruction for an operation via the displayed setting screen. For example, the processor 610 detects selection of a button used for an instruction for execution of an operation on the displayed setting screen to receive an execution instruction for the operation. The processor 610 functions as the operation control section 610*c* and performs a reoperation of the operation corresponding to the selected history item 711.

In this embodiment, when performing the reoperation based on the history item 711, the processor 610 stores an operation history of the performed reoperation in the storage medium 640 in association with information indicating on which history item 711 the reoperation is based.

Consequently, an operation history about the reoperation based on the history item 711 corresponding to a certain operation (the original operation) is generated. The processor 610 also displays the history item 711 indicating the generated operation history. When a reoperation based on the history item 711 corresponding to the reoperation is performed, the history item 711 corresponding to the same operation as the original operation (a reoperation of the reoperation) is generated. In this embodiment, the history item 711 corresponding to the reoperation of the reoperation is also the history item 711 based on the history item 711 corresponding to the original operation.

The processing in which the processor 610 executes the reoperation based on the history item 711 is as explained above.

In this embodiment, when displaying the history item 711 in the history display region 710, the processor 610 performs the following. That is, the processor 610 displays the history item 711 corresponding to a reoperation based on the history item 711 corresponding to a certain operation (the original operation) in a display form having a decided relation with the history item 711 corresponding to the original operation. In the following explanation, the decided relation is referred to as a display relation. In this embodiment, the display relation is a relation in which a color is common and a nested relation. That is, the processor 610 displays the history item 711 corresponding to the reoperation in a color common to the history item 711 corresponding to the original operation and to be a nest of the history item 711 corresponding to the original operation.

The processing in which the processor 610 displays the history item 711 in the history display region 710 is more specifically explained below.

The processor 610 acquires operation histories in the past from the storage medium 640. The processor 610 specifies, from the acquired operation histories, as a group having a relation in which corresponding operations are the same operations (hereinafter, related group), an operation history group in which corresponding operations are in a relation of an original operation and a reoperation. More specifically, the processor 610 specifies, as related groups, operation histories associated with information, which indicates a reoperation based on the same history item 711, and operation histories corresponding to the history item 711. The processor 610 specifies, about the respective specified related groups, the latest operation history among the operation histories included in the related groups.

The processor 610 displays, side by side, the history item 711 indicating the latest operation history of the related groups and the history item 711 indicating an operation history not belonging to all the related groups in time-series order about execution periods of operations corresponding to the history items 711. In this case, the processor 610 displays the history item 711 indicating the latest operation history of the related groups to be a nest of the history item 711 indicating an operation history of the original operation (the oldest operation history) in the corresponding related groups. That is, the processor 610 displays the history item 711 indicating the latest operation history of the related groups to be included in the history item 711 corresponding to the original operation. The processor 610 displays the history item 711 indicating the latest operation history of the related groups in a color common to the history item 711 corresponding to the original operation.

When three or more history items 711 are included in the related groups (when there are a plurality of history items 711 corresponding to the reoperation of the original operation), the processor 610 performs the following. That is, the processor 610 displays the history item 711 indicating an operation history different from both of the latest operation history and the operation history of the original operation in a display form having a display relation with the history item 711 corresponding to the original operation. That is, the processor 610 displays the history item 711 to be a nest of the history item 711 corresponding to the original operation and to have a color common to the history item 711 corresponding to the original operation.

In this way, the processor 610 includes, in the history item 711 corresponding to the original operation, the history item 711 corresponding to the reoperation. However, the processor 610 may include, in one of the history items 711 corresponding to the reoperation (for example, the history item 711 corresponding to the latest operation history among the history items 711 corresponding to the reoperation), the history item 711 corresponding to the original operation and the remaining history items 711 corresponding to the reoperation.

The processor 610 displays the history item 711 indicating an operation history not belonging to all the related groups in a display form not having a display relation with the history items 711 corresponding to all the related groups. That is, the processor 610 displays the history item 711 indicating the operation history not belonging to all the related groups not to be a nest of the history items 711 belonging to all the related groups and to have a color different from colors of the history items 711 corresponding to all the related groups.

In the example shown in FIG. 9, the processor 610 displays the history item 711*b* corresponding to a reoperation (reprinting) performed on July 30 of a copy operation performed on July 22, which is an original operation, to be a nest of the history item 711*a* corresponding to the original operation. That is, the processor 610 displays the history item 711*b* to be included in the history item 711*a*. The processor 610 displays the history item 711*a* and the history item 711*b* in a common color. The processor 610 displays the history item 711*c* corresponding to an operation different from the original operation in a color different from the color of the history items 711*a* and 711*b*. The processor 610 displays the history item 711*b* displayed as the nest of the history item 711*a*, the history item 711*c*, and the other history items 711 in time-series order (timeline-displayed) about periods when operations corresponding to the history items were executed.

In this case, the processor 610 displays the history item 711a together with the history item 711b. Therefore, the processor 610 does not display the history item 711a in time-series order. Accordingly, the processor 610 does not display, between the history item 711a and the history item 711b, the history item 711c corresponding to the operation performed between the operation of the history item 711a and the operation of the history item 711b. In this way, when displaying the history item 711 corresponding to the reoperation to be a nest of the history item 711 corresponding to the original operation, the processor 610 performs control not to display, between the history item 711 corresponding to the original operation and the history item 711 corresponding to the reoperation, the history item 711 corresponding to another operation performed between the original operation and the reoperation. As the history item 711 corresponding to the original operation and the history item 711 corresponding to the reoperation, the history item 711 corresponding to the reoperation may be displayed in time-series following a period of the history item 711 corresponding to the original operation or the history item 711 corresponding to the original operation may be displayed in time-series following a period of the history item 711 corresponding to the latest reoperation. A history item corresponding to another operation performed between related history items is not included in the related history items. However, where the related history items are displayed is not limited.

Figure 10:
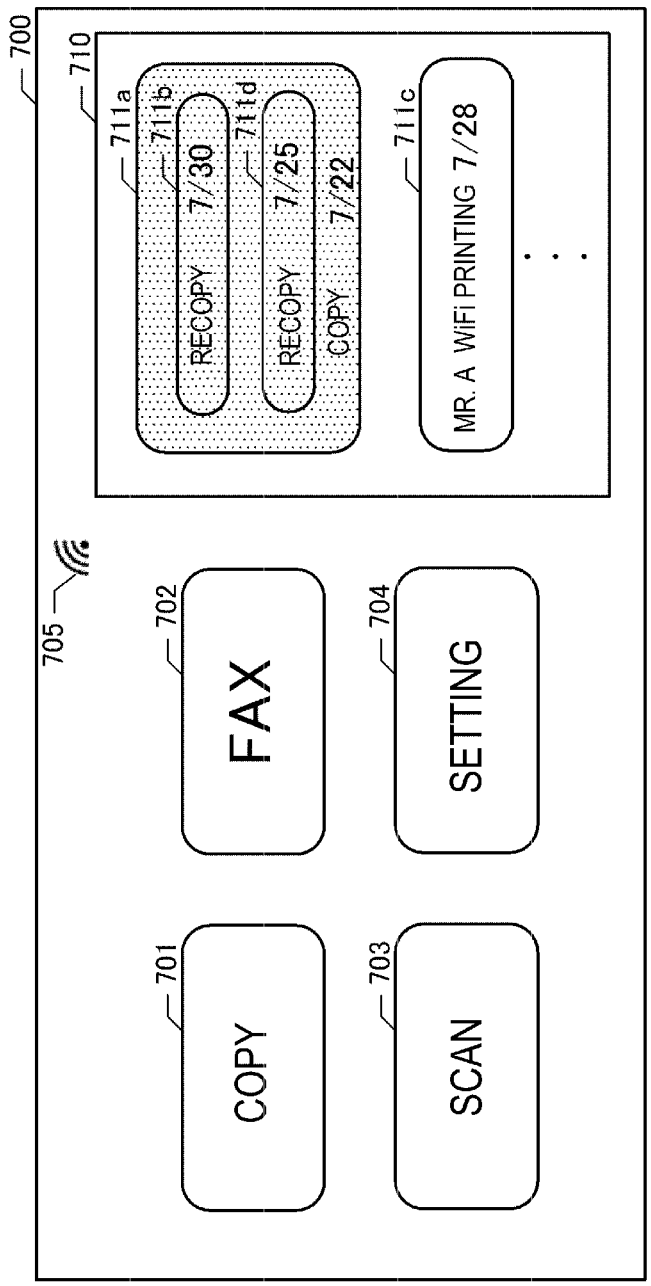
FIG. 10 is a diagram showing an example of the main screen.

When there are a plurality of history items 711 about the reoperation of the original operation, the processor 610 displays the plurality of history items 711 about the reoperation to be nests of the history item 711 corresponding to the original operation. In an example shown in FIG. 10, the processor 610 displays, in addition to the history item 711b, the history item 711d corresponding to reprinting based on the history item 711a performed on July 25 as a nest of the history item 711a. In this case, the processor 610 displays, in addition to the history item 711a, the history item 711d together with the history item 711b. Therefore, the processor 610 does not display the history item 711d in time-series.

As in the first embodiment, when any one of items (for example, the mode items 701 to 704) corresponding to a decided operation mode and items (for example, the radio wave mark 705) corresponding to a decided port is selected, the processor 610 performs the following. That is, the processor 610 displays, on the display section 620, a screen corresponding to the selected item and including the history display region 710. In that case, the processor 610 extracts operation histories concerning the selected item. For example, when the selected item is a mode item, the processor 610 extracts operation histories corresponding to an operation mode corresponding to the selected item. For example, when the selected item is an item corresponding to a port, the processor 610 extracts operation histories corresponding to a printing job acquired using the corresponding port. The processor 610 timeline-displays the history items 711 indicating the extracted operation histories in the history display region 710. More specifically, the processor 610 extracts, from the respective extracted operation histories, dates and times associated with the operation histories, sorts the operation histories in descending order about the extracted dates and times to specify time-series order, and displays, side by side, in the specified order, the history items 211 indicating the operation histories. In this case as well, the processor 610 displays the history item 711 corresponding to the reoperation in a display form having a display relation with the history item 711 corresponding to the original operation.

Figure 11:
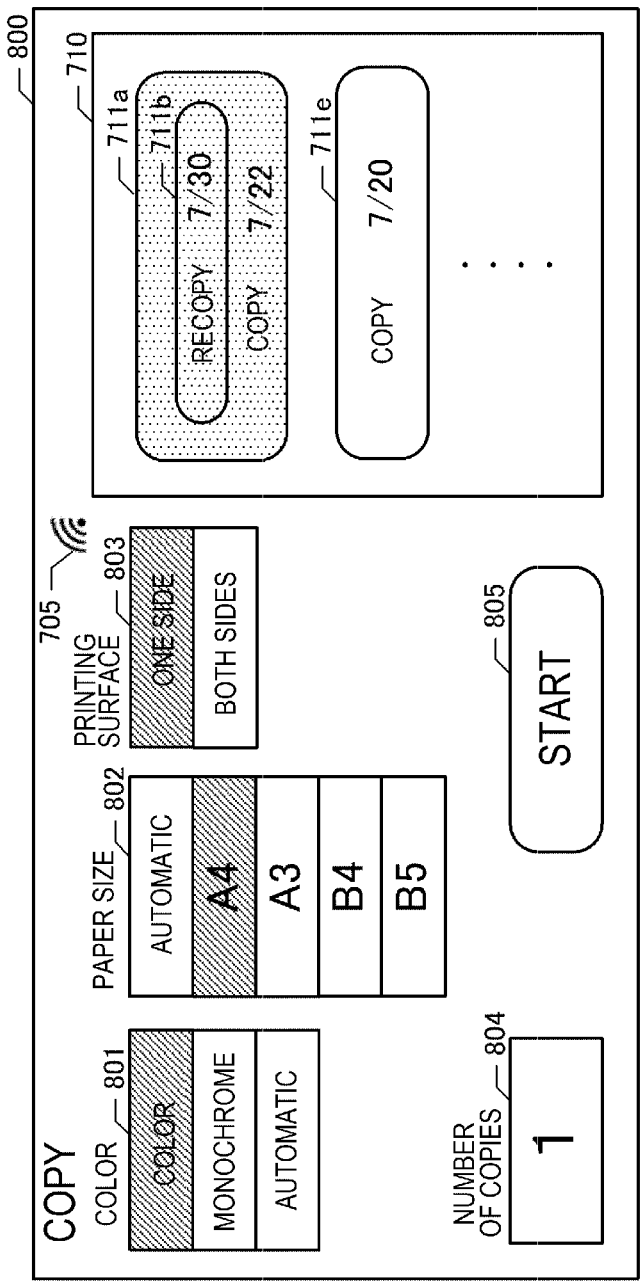
FIG. 11 is a diagram showing an example of a setting screen concerning copying.

For example, when the mode item 701 is selected, the processor 610 displays a setting screen 800 shown in FIG. 11 on the display section 620. The setting screen 800 is the same screen as the setting screen 300 in the first embodiment and includes a color selection region 801, a paper size selection region 802, a printing surface selection region 803, a number of copies designation region 804, an execution button 805, the radio wave mark 705, and the history display region 710. The elements 801 to 805 are respectively the same as the elements 301 to 305 of the setting screen 300 in the first embodiment.

When displaying the setting screen 800, the processor 610 extracts operation histories concerning a copy mode from the storage medium 640 and timeline-displays the history items 711 indicating the extracted operation histories in the history display region 710 of the setting screen 800. In this embodiment, the processor 610 displays the history item 711 corresponding to the reoperation (recopying) of the original operation (copying) in a display form having a display relation with the history item 711 corresponding to the original operation.

In an example shown in FIG. 11, in the history display region 710 of the setting screen 800, the history item 711b corresponding to the reoperation of the copying of the original operation is displayed to be a nest of the history item 711a corresponding to the original operation and to have a color common to the history item 711a.

With the configuration explained above, the multifunction peripheral 600 displays the history item 711 corresponding to the reoperation of the original operation in a display form having a display relation with the history item 711 corresponding to the original operation. Consequently, the multifunction peripheral 600 can display a plurality of history items 711 having a relation in which corresponding operations are the same operations to make it possible to visually recognize that the plurality of history items 711 have such a relation. As a result, the user can easily grasp, among the displayed history items 711, items having a relation in which the items correspond to operation histories of the same operation.

(2-2) Details of Processing of the Printing Apparatus

Figure 12:
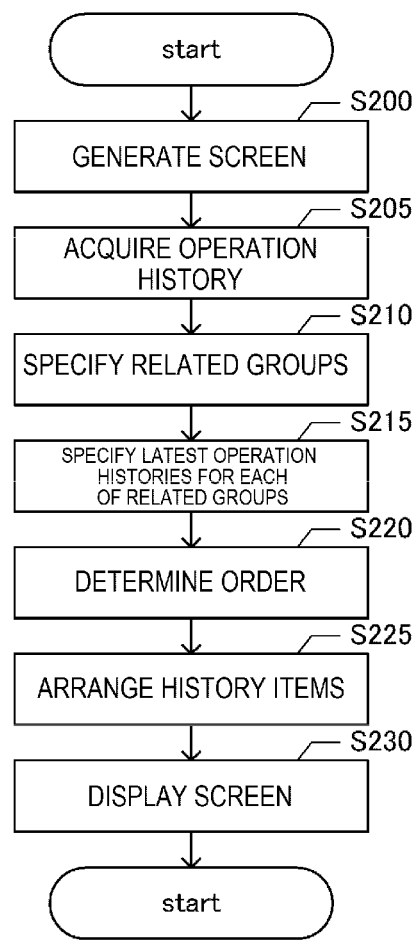
FIG. 12 is a flowchart showing an example of processing of the printing apparatus.

Processing of the multifunction peripheral 600 in this embodiment is the same as the processing shown in FIGS. 6 and 7 except the processing for timeline-displaying the history items 711 in the history display region 710 in the processing in S100, S130, and S165. Details of the processing in S100, S130, and S165 in this embodiment are explained with reference to FIG. 12.

In S200, the processor 610 functions as the display control section 610a, generates information concerning a screen including the history display region 710, and stores the information in the RAM. More specifically, the processor 110 generates, as the information concerning the screen, configuration information of the screen (information such as items forming the screen and arrangement positions of the items) and stores the configuration information in the RAM. In S100, the processor 610 generates information concerning the main screen 700. In S130, the processor 610 generates a setting screen for an operation mode corresponding to the selected mode item. In S165, the processor 610 generates a setting screen concerning communication performed using the wireless communication port.

In S205, the processor 610 functions as the display control section 610a and acquires operation histories in the past from the storage medium 640.

In S210, the processor 610 functions as the display control section 610a and specifies related groups from the operation histories acquired in S205. More specifically, the processor 610 specifies, as the related groups, operation histories associated with information indicating a reoperation based on the same history items 711 and operation histories corresponding to the history items 711.

In S215, the processor 610 functions as the display control section 610a and specifies, about the respective related groups specified in S210, the latest operation history among the operation histories included in the related groups.

In S220, the processor 610 functions as the display control section 610a and determines time-series order about the operation histories specified for each of the related groups in S215 and operation histories not belonging to all the related groups. More specifically, the processor 610 determines, based on dates and times associated with the respective operation histories, order of the respective operation histories in descending order of the associated dates and times.

In S225, the processor 610 functions as the display control section 610a and processes, as explained below, the history items 711 indicating the operation histories specified for each of the related groups in S215 and the history items 711 indicating the operation histories not belonging to all the related groups. That is, the processor 610 adjusts the information concerning the screen stored in the RAM to include the history items 711 in the history display region 210 side by side in the order determined in S220.

The processor 610 displays the history item 711 indicating the latest operation history of the related group to be a nest of the history item 711 indicating the operation history of the original operation in the related group corresponding to the related group. That is, the processor 610 includes the history item 711 indicating the latest operation history of the related group in the history item 711 corresponding to the original operation. The processor 610 sets the history item 711 indicating the latest operation history of the related group to a color common to the history item 711 corresponding to the original operation. The processor 610 sets colors of the history items 711 to be different for each of the related groups. The processor 610 sets a color of the history items 711 not belonging to all the related groups to a color different from colors of the history items 711 of all the related groups.

In S230, the processor 610 displays, based on the information concerning the screen stored in the RAM, a screen corresponding to the information on the display section 120.

(3) Other Embodiments

The embodiments explained above are examples for carrying out the present disclosure. Various other embodiments can be adopted. The embodiments explained above are examples. Embodiments in which a part of the components are omitted and other components are added or replaced can be adopted.

The multifunction peripheral 100 in the first embodiment performs the following processing when any one of the items (the mode items 201 to 204) corresponding to the operation modes and the item (the radio wave mark 205) corresponding to the wireless communication port is selected. That is, the multifunction peripheral 100 performs processing for narrowing down the history items 211 displayed in the history display region 210 to the history item 211 corresponding to the selected item. The same applies to the multifunction peripheral 600 in the second embodiment.

However, when another item is selected, the multifunction peripheral 100 may perform processing for narrowing down the history items 211 displayed in the history display region 210 to the history item 211 corresponding to the selected item. The multifunction peripheral 600 may perform the same processing.

For example, it is assumed that an item corresponding to the scanner communication port (for example, a soft button for instructing display of a screen for performing setting about the operation of the built-in scanner 170) is included in the main screen 200, the setting screen concerning the scan mode, or the like. In this case, for example, the processor 110 functions as the display control section 110a and extracts, according to selection of the item, operation histories concerning, for example, a transmission job for transmitting, to a designated computer, a printing job and scan data acquired from the storage medium 140 using the scanner communication port. The processor 110 may display, on the display section 120, the history display region 210 including the history items 211 indicating the extracted operation histories.

Consequently, the processor 110 can more easily realize processing under the same conditions as conditions of printing jobs, transmission jobs, and the like performed in the past acquired using the built-in scanner 170.

For example, the processor 110 functions as the display control section 110a and, when an item used for an instruction for display of a screen used for various settings of the color setting button 403 and the like is selected, may perform the following. That is, the processor 110 may extract operation histories of operations performed after a setting change using a screen corresponding to the selected item and display the history items 211 indicating the extracted operation histories to be included in the history display region 210. For example, the processor 110 may extract operation histories of printing in which setting change for a color is performed and timeline-display the history items 211 indicating the extracted operation histories.

In the first embodiment, when any one of the items corresponding to the operation modes and the item corresponding to the wireless communication port is selected, the multifunction peripheral 100 performs the processing for narrowing down the history items 211 to be displayed. The same applies to the multifunction peripheral 600 in the second embodiment. That is, it is possible to combine the first embodiment and the second embodiment.

However, when a part of the items corresponding to the operation modes and the item corresponding to the wireless communication port is selected, the multifunction peripheral 100 may perform the processing for narrowing down the history items 211 to be displayed in the history display region 210. For example, when the mode item 201 corresponding to the copy mode is selected, the multifunction peripheral 100 may perform processing for narrowing down the history items 211 to be displayed in the history display region 210 to the history items 211 corresponding to the copy mode. If history items corresponding to the original operation and history items corresponding to the reoperation are history items corresponding to the copy mode, the multifunction peripheral 100 may display these items in a display relation. The multifunction peripheral 600 may perform the same processing.

In the first embodiment, the storage medium 140 is included in the multifunction peripheral 100. The multifunction peripheral 100 uses the storage medium 140 for the storage of the printing job and the like. The same applies to the multifunction peripheral 600 in the second embodiment. However, the multifunction peripheral 100 may use an external storage medium (for example, an externally attached storage medium or an external storage server) for the storage of the printing job and the like. The multifunction peripheral 600 may perform the same processing. In that case, the multifunction peripheral 100 (600) may not include the storage medium 140 (640).

In the first embodiment, the display section 120 is included in the multifunction peripheral 100. The multifunction peripheral 100 uses the display section 120 for the display of the main screen 200 and the various setting screens, and the like. The same applies to the multifunction peripheral 600 in the second embodiment. However, the multifunction peripheral 100 may use an externally attached device (for example, an externally attached monitor or a display section of a tablet device or a notebook PC) for the display of the main screen 200 and the various setting screens, and the like. The multifunction peripheral 600 may also use an externally attached device for the display of the various screens. In that case, the multifunction peripheral 100 (600) may not include the display section 120 (620).

In the first embodiment, the multifunction peripheral 100 acquires a printing job using a plurality of ports. The same applies to the multifunction peripheral 600 in the second embodiment. However, the multifunction peripheral 100 (600) may acquire a printing job using one port.

In the second embodiment, the display relation is the relation in which a color is common and the nested relation. However, the display relation is not limited to these relations if a relation of histories is seen. For example, the display relation may be at least one of a relation in which at least one of a shape, a color, and a pattern is common and the nested relation. Specifically, the display relation may be a relation in which a pattern is common. In that case, the processor 610 displays the history item 711 corresponding to the original operation and the history item 711 corresponding to the reoperation to have a common pattern.

Consequently, the multifunction peripheral 600 can display a plurality of history items 711 having a relation in which corresponding operations are the same operations to make it possible to more easily visually recognize that the plurality of history items 711 have such a relation.

In the second embodiment, even when there are the plurality of history items 711 corresponding to the reoperation of the original operation, the processor 610 displays the plurality of history items 711 as nests of the history item 711 corresponding to the original operation. When an excessively large number of history items 711 are included in the history item 711 of the original operation as nests, the size of the history item 711 of the original operation is excessively large and, for example, the entire history item 711 cannot be displayed on the display section 620 at a time. Visibility of the user is deteriorated.

Accordingly, when there are the plurality of history items 711 corresponding to the reoperation, the processor 610 may display only a predetermined number of (for example, two, three, four, or five) history items 711 of the reoperation as nests of the history item 711 of the original operation.

For example, the processor 610 may display, among the history items 711 corresponding to the reoperation, a predetermined number of history items 711 in order from the history item 711 having the earliest execution period of operations as nests of the history item 711 corresponding to the original operation. In this case, the processor 610 does not display the remainder of the history items 711 corresponding to the reoperation as nests of the history item 711 corresponding to the original operation and timeline-displays the remainder in the same manner as the other history items 711.

Figure 13:
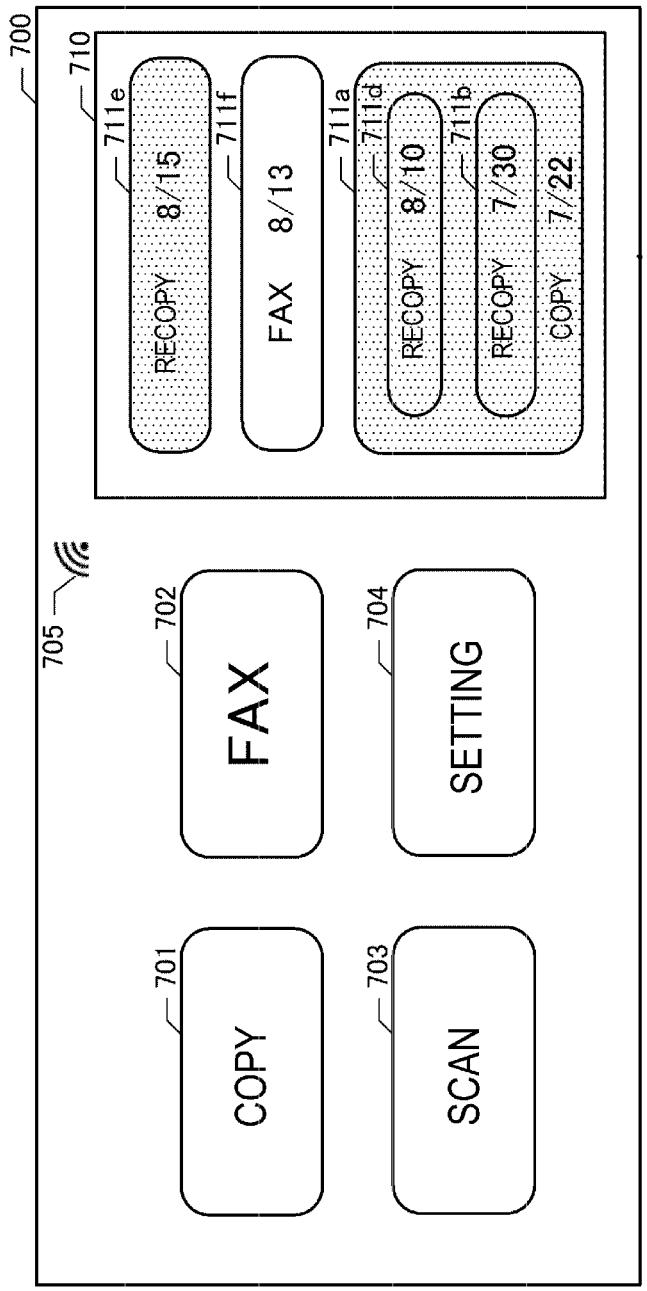
FIG. 13 is a diagram showing an example of a main screen.

For example, in an example shown in FIG. 13, with respect to the history item 711*a* corresponding to the original operation, there are three history items 711 (the history item 711*b*, the history item 711*d*, and the history item 711*e*) corresponding to the reoperation based on the history item 711*a*. It is assumed that the number of history items 711 that can be nested in the history item 711 corresponding to the original operation is two. Therefore, the processor 610 specifies two history items (the history item 711*b* and the history item 711*d*) having the earliest execution period of operations among the history item 711*b*, the history item 711*d*, and the history item 711*e*. The processor 610 displays the specified two history items to be nests of the history item 711*a* corresponding to the original operation and displays the remaining history item 711*e* in the same manner as the other history items 711.

Consequently, the multifunction peripheral 600 can prevent the size of the history item 711 including the other history items 711 as nests from becoming excessively large and prevent the visibility of the user from being deteriorated.

In this case, the processor 610 may display, as explained below, among the history items 711 corresponding to the reoperation, the history items 711 not displayed as nests of the history item 711 corresponding to the original operation. That is, the processor 610 may display the history items 711 such that at least one of a shape, a color, and a pattern of the history items 711 is common to the history item 711 corresponding to the original operation.

Consequently, the multifunction peripheral 600 can make it possible to easily visually grasp that the history items 711 corresponding to the reoperation not to be nests also have a relation with the history item 711 corresponding to the original operation.

The operation mode only has to be a mode corresponding to an operation executed by the printing apparatus. When the printing apparatus executes each of a plurality of kinds of operations to be executed, operation modes correspond to the respective operations. The operation modes may be defined in levels such as copying and fax or may be subdivided into levels such as number of copies setting and color setting of the copying and defined.

The item corresponding to each of the operation modes only has to be able to be used for shift to the corresponding operation mode. The item corresponding to each of the operation modes may be a soft button as in the embodiments or may be a display block, a tab, or the like.

The operation history only has to be able to indicate a history of some operation performed in the printing apparatus. The operation history may indicate a history of the operation (copying, FAX transmission, or the like) corresponding to the operation mode as in the embodiments or may indicate a history of an operation for changing setting items. The operation history may indicate a history of an operation for receiving an operation of the user or may indicate a history of maintenance or the like performed on the printing apparatus.

The setting screen concerning the copy mode only has to be able to be used for a change of a setting item about the copy operation and an instruction for the copy operation.

The storage control section only has to cause the storage medium to store the printing job. The storage control section may store, as the printing job, information capable of reproducing at least a part of the operation corresponding to the printing job. For example, the storage control section may store, as the printing job, information capable of reproducing the setting about the operation corresponding to the printing job (for example, setting information about the operation). The storage control section may store, as the printing job, information capable of reproducing all of operations corresponding to the printing job (operations in the same setting for the same image data) (for example, information including operation target image data and setting information about the operations).

Further, the present disclosure is also applicable as a program executed by a computer and a method. The present disclosure can also be applied to a device not having a printing function and a program and a method of the device. The present disclosure may be applied to, for example, a network scanner not having the printing function. The program and the method explained above are realized as an independent apparatus in some cases and are realized using components included in a plurality of apparatuses in other cases. The program and the method include various forms. The program and the method can be changed as appropriate, for example, a part of the program and the method is software and a part of the program and the method is hardware. Further, an invention is established as a recording medium for a program. Naturally, the recording medium for the program may be a magnetic recording medium or may be a semiconductor memory. All recording media to be developed in future can be considered completely the same.

What is claimed is:

1. A printing apparatus including a plurality of operation modes including a copy mode, the printing apparatus comprising:
   a display configured to display a main screen including a plurality of items respectively corresponding to the plurality of operation modes and operation histories in past of the printing apparatus;
   a processor including a display control section configured to switch, according to selection of the item corresponding to the copy mode out of the plurality of items displayed on the display, displaying of the display to display a setting screen concerning the copy mode, the setting screen including the operation history concerning the copy mode extracted out of the operation histories and including a plurality of setting items respectively corresponding to a plurality of copy settings; and
   a printer configured to, when the operation history displayed on the setting screen is selected by a user, perform reprinting according to setting included in the selected operation history.

2. The printing apparatus according to claim 1, wherein the processor further includes
   a storage control section configured to cause a storage medium to store a printing job already performed in the copy mode by the printing apparatus, and
   an operation control section configured to, when the operation history concerning the copy mode is selected, perform control to enable reprinting of a printing job corresponding to the selected operation history, the printing job being stored in the storage medium.

3. The printing apparatus according to claim 1, further comprising a first port for acquiring a printing job, wherein
   the display displays a first item corresponding to the first port, and
   the display control section switches, according to selection of the first item displayed on the display, the displaying of the display to display the operation history extracted out of the operation histories and corresponding to the printing job acquired using the first port.

4. The printing apparatus according to claim 3, further comprising a second port used for communication with a built-in scanner of the printing apparatus, wherein
   the display control section switches, according to selection of a second item corresponding to the second port, the displaying of the display to display the operation history extracted out of the operation histories and concerning a printing job acquired using the second port.

5. A print producing method executed by a printing apparatus including a plurality of operation modes including a copy mode, the printing apparatus including a display section configured to display a main screen including a plurality of items respectively corresponding to the plurality of operation modes and operation histories in past of the printing apparatus, the print producing method comprising:
   displaying, according to selection of the item corresponding to the copy mode out of the plurality of items displayed on the display section, a setting screen concerning the copy mode, the setting screen including the operation history concerning the copy mode extracted out of the operation histories and including a plurality of setting items respectively corresponding to a plurality of copy settings; and
   when the operation history displayed on the setting screen is selected by a user, performing reprinting according to setting included in the selected operation history to produce a print.

6. A non-transitory computer-readable storage medium storing a program for causing a computer to function as:
   a display function for displaying, on a display, a first screen including a plurality of items selectable by a user and operation histories in past; and
   a switching function for switching, according to selection of one of the items, displaying of the display to display a second screen including the operation history corresponding to the item among the operation histories and including a plurality of setting items respectively corresponding to a plurality of settings for an operation mode of the selected item, the second screen being a setting screen for setting an operation corresponding to the selected item.

* * * * *